US 7,199,883 B1

(12) United States Patent
Schaad (10) Patent No.: US 7,199,883 B1
(45) Date of Patent: Apr. 3, 2007

(54) SYSTEM AND METHOD FOR SENSING POSITION OF A VEHICLE

(75) Inventor: Joseph W. Schaad, Pittsburgh, PA (US)

(73) Assignee: Union Switch & Signal, Inc., Pittsburgh, PA (US)

( * ) Notice: Subject to any disclaimer, the term of this patent is extended or adjusted under 35 U.S.C. 154(b) by 106 days.

(21) Appl. No.: 11/108,238

(22) Filed: Apr. 18, 2005

(51) Int. Cl.
*G01B 11/14* (2006.01)

(52) U.S. Cl. .................. 356/614; 108/169; 342/350; 340/988; 246/167 R; 246/122 R (58) Field of Classification Search .............. 356/614, 356/317; 180/168–169; 246/122 R, 167 R; 342/350, 355, 36; 340/988–989
See application file for complete search history.

(56) References Cited

U.S. PATENT DOCUMENTS

| | | | |
|---|---|---|---|
| 3,145,291 A | | 8/1964 | Brainerd |
| 3,935,922 A | * | 2/1976 | Cooper et al. .............. 180/168 |
| 3,940,630 A | | 2/1976 | Bergonz |
| 4,361,202 A | * | 11/1982 | Minovitch ................. 180/168 |
| 4,692,603 A | * | 9/1987 | Brass et al. ................. 235/454 |
| 4,729,660 A | | 3/1988 | Tsumura et al. |
| 4,855,915 A | | 8/1989 | Dallaire |
| 5,008,557 A | | 4/1991 | Noji et al. |
| 5,367,458 A | | 11/1994 | Roberts et al. |
| 5,517,924 A | | 5/1996 | He et al. |
| 5,586,504 A | | 12/1996 | He et al. |
| 5,812,267 A | | 9/1998 | Everett, Jr. et al. |
| 6,011,508 A | | 1/2000 | Perreault et al. |
| 6,044,770 A | | 4/2000 | Davey et al. |
| 6,181,410 B1 | | 1/2001 | Ishida et al. |

(Continued)

FOREIGN PATENT DOCUMENTS

EP        0 976 639 A1    2/2000

(Continued)

OTHER PUBLICATIONS

Kim, I. et al., "Technology Development for U.S. Urban Maglev", MAGLEV '2002, 2002, 7 pp.

(Continued)

*Primary Examiner*—Gregory J. Toatley, Jr.
*Assistant Examiner*—Tri Ton
(74) *Attorney, Agent, or Firm*—Kirk D. Houser; Eckert Seamens Cherin & Mellott, LLC (57) ABSTRACT

A system determines the position of a vehicle moving responsive to an inverter having a 360 degree electrical cycle. The system includes a guideway comprising a linear synchronous motor excited by the inverter, a MAGLEV adapted to move with respect to the guideway and the linear synchronous motor, and a reflective pattern disposed along the guideway. A laser light source is coupled to the MAGLEV and directs light toward the pattern. A light sensor is coupled to the MAGLEV and senses the light from the light source which is reflected from the pattern. The light sensor outputs a plurality of pulses corresponding to movement of the MAGLEV with respect to the pattern. A modulator, radio transmitter, radio receiver, demodulator and wayside processor cooperate with the light sensor. The processor determines the position of the MAGLEV by accumulating the pulses. The position corresponds to the 360 degree electrical cycle.

20 Claims, 3 Drawing Sheets

U.S. PATENT DOCUMENTS

| | | |
|---|---|---|
| 6,439,513 B1 | 8/2002 | Pascoe |
| 6,618,128 B2 | 9/2003 | Van Voorhis et al. |
| 2003/0148698 A1 | 8/2003 | Koenig |
| 2005/0068042 A1 | 3/2005 | Post |

FOREIGN PATENT DOCUMENTS

| | | |
|---|---|---|
| JP | 53069682 | 6/1978 |
| JP | 63055409 | 3/1988 |
| JP | 63061102 | 3/1988 |
| JP | 2184201 | 7/1990 |
| JP | 10206155 | 8/1998 |

OTHER PUBLICATIONS

Magnemotion, Inc., "Magnemotion Maglev M3", "The M3 Urban Transportation System", MagneMotion Document UM-1, Version 1, Jan. 8, 2003, 1-39 pp.

* cited by examiner

SYSTEM AND METHOD FOR SENSING POSITION OF A VEHICLE

BACKGROUND OF THE INVENTION

1. Field of the Invention

This invention relates to vehicle position sensing systems and, more particularly, to passive position sensing systems for a levitated vehicle, such as, for example, a Magnetic Levitated Vehicle (MAGLEV). The invention also relates to a method for determining the position of a moving vehicle.

2. Background Information

There are numerous situations when it is required to use a non-contacting mechanism to measure location along a track of a moving object. One example is the problem of accurately locating the position and velocity of a magnetically levitated train car moving above a linear track. Accurate information on the location of the car in such cases would, for example, be needed in order to synchronize the drive currents of a linear synchronous motor (LSM) drive with respect to the position of the train. In such drive systems, the propulsion is obtained by exciting currents in multi-phased windings that are embedded in the track. These currents interact with the magnetic fields arising from an array of permanent magnets on the moving train car. In order to use the LSM drive to accelerate the car, to keep it in motion at a constant speed, and then to decelerate it, the phase, amplitude and frequency of the currents in the LSM drive windings must be accurately controlled at all times. This requirement must be met by actively controlling the inverter that supplies the currents to the track. However, to achieve this end, it is necessary that the train car should be able to communicate its position, within an accuracy of a few millimeters, to the control circuits of the inverters. It is also desired that the communicated position should be insensitive to variations in the levitation height of the train car as might be caused, for example, by changes in the passenger loading. See, for example, United States Patent Application Publication No. 2005/0068042.

Magnetic Levitated Vehicle (MAGLEV) systems are well known in the art. Examples are disclosed in U.S. Pat. Nos. 5,517,924; 5,586,504; and 6,044,770.

Most high-speed MAGLEVs are projected to run, for example, at speeds of about 150 to about 300 mph, while low-speed MAGLEVs are projected to run at speeds of up to about 30 to about 50 mph. A wide range of different speeds is possible.

Figure 1:
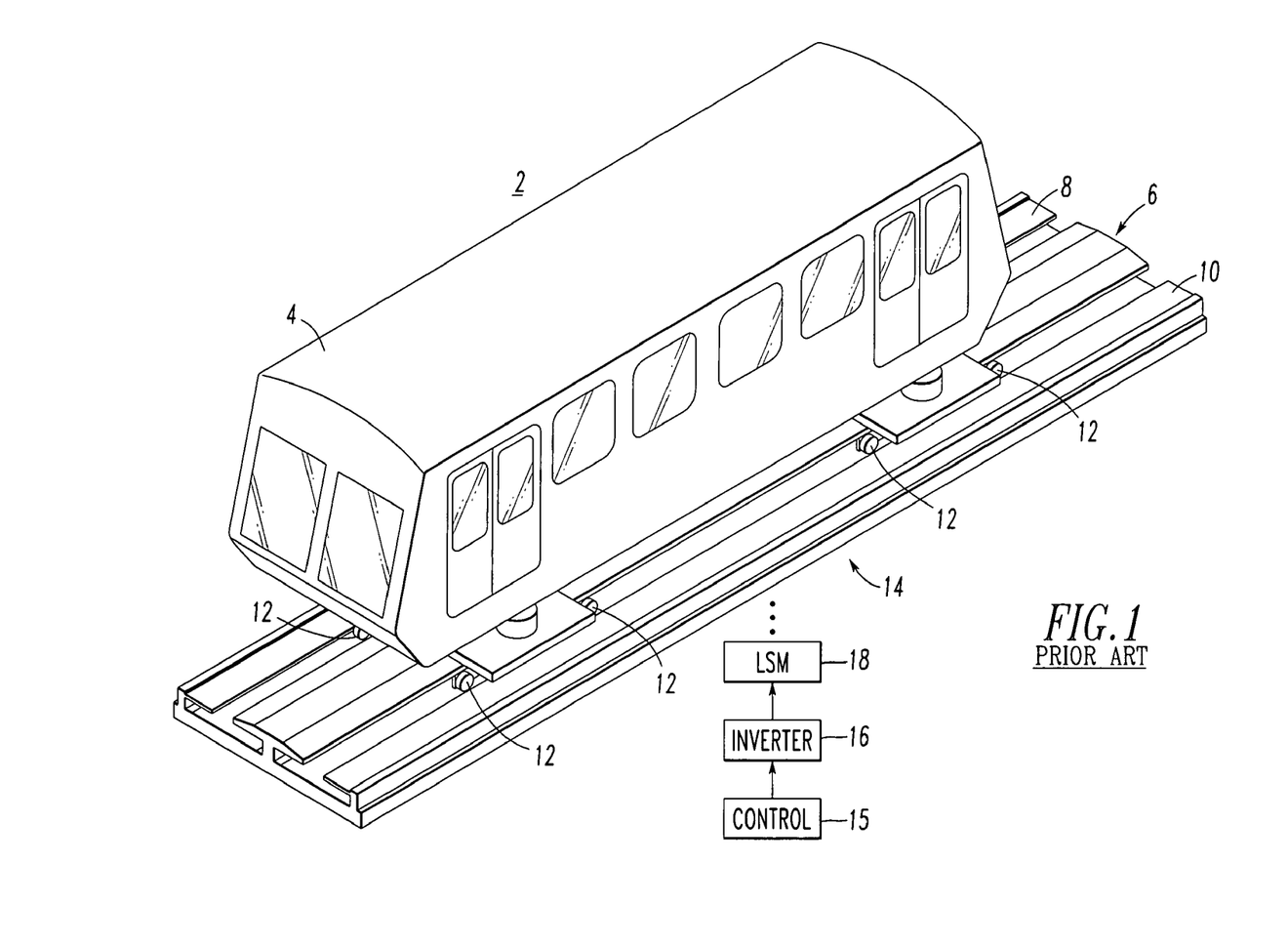
FIG. 1 is an isometric view of a Magnetic Levitated Vehicle (MAGLEV) system including a MAGLEV and a guideway.

FIG. 1 shows a MAGLEV system 2 including a MAGLEV 4 and a guideway 6 having two rails 8,10. The MAGLEV 4 moves over the rails 8,10, although any suitable count of rails may be employed. Extending from the MAGLEV 4 are magnetic sources (not shown), which are configured to flank each of the rails 8,10. These rails house composite coils (not shown). As the MAGLEV 4 travels along the guideway 6, its magnetic sources extend downward, with each source flanking one of the rails 8,10 and flanking the coils housed within it.

The composite coils are incapable of levitating and stabilizing the MAGLEV 4 at low speeds. One alternative for addressing this low-speed problem is to affix wheels 12 to the bottom of the MAGLEV 4, in order to support the MAGLEV at certain speeds. The wheels 12 can be retracted as with conventional aircraft. Alternatively, the surface of the guideway 6 can be sloped away from the rail composite coil structure (not shown). Another alternative employs an additional coil (not shown) situated in the guideway 6.

Preferably, the MAGLEV 4 is "passive" and its motion is controlled by the MAGLEV guideway 6 and not by devices onboard the MAGLEV 4. For example, the guideway 6 is organized into a plurality of "zones," such as zone 14. A control circuit 15 and an inverter, such as 16, control each zone and determine the motion of the MAGLEV 4 via the LSM drive 18. Thus, the zone inverter 16 controls the physical motion (e.g., acceleration, deceleration, speed regulation) of the MAGLEV 4, which has arrays of permanent magnets (not shown) to provide suspension and guidance forces as well as to provide the field for the LSM drive 18. Feedback-controlled currents in control coils (not shown) wound around the magnets stabilize the suspension. The LSM drive windings (not shown) are integrated with the suspension rails 8,10 and are excited by the zone inverters, such as 16, located along the guideway 6.

It is known to determine speed and position of a moving vehicle. A prior proposal for a MAGLEV inductively couples a relatively low frequency (e.g., 20 kHz) signal from the MAGLEV to a wayside loop containing a series of transpositions. The resulting analog signal is sampled and processed by a microprocessor to detect the signal peaks that correspond to the wayside loop transpositions. This proposal is extremely sensitive to in-band induced noise from the LSM drive. In addition, any slight change in vehicle height (expected to occur due to levitation) causes significant variations in signal strength measured at the wayside loop, which, in turn, alters the ability of the microprocessor to properly detect the peaks in the analog signal level.

There remains a substantial need for improvement in vehicle position sensing systems and, in particular, to such systems for a levitated vehicle, such as, for example, a MAGLEV. There is also room for improvement in methods for determining the position of a moving vehicle with respect to a guideway.

SUMMARY OF THE INVENTION

These needs and others are met by the present invention, which provides a system for determining the position of a moving vehicle, such as a MAGLEV, along a guideway. The system senses position through a light sensor (e.g., without limitation, a laser sensor) aimed at a reflective pattern (e.g., without limitation, an elongated strip of optical tape including a pattern of reflective segments or bars) along the guideway. The light reflected back to the light sensor results in a sequence of pulses that are analyzed to determine the position of the moving vehicle. The pulses are accumulated to determine the position, which corresponds to a 360 degree electrical cycle of an inverter that excites a linear synchronous motor of the guideway.

The pulses may be transmitted to a wayside control location using a wireless signal (e.g., without limitation, narrowband FM radio). At specific intervals, the position signal may be reset to zero through a variation in the width of the reflective segments.

In accordance with one aspect of the invention, a system determines the position of a vehicle which moves responsive to an inverter having a 360 degree electrical cycle, the system comprises: a guideway comprising a linear synchronous motor excited by the inverter; a vehicle adapted to move with respect to the guideway and the linear synchronous motor thereof; a reflective pattern disposed along the guideway; a light source coupled to the vehicle, the light source adapted to direct light toward the reflective pattern; a light sensor coupled to the vehicle, the light sensor adapted to sense the light from the light source which is reflected from the reflective pattern and to output a plurality of pulses corresponding to movement of the vehicle with respect to the reflective pattern; and a circuit cooperating with the light sensor, the circuit adapted to determine the position of the vehicle from the pulses, the position corresponding to the 360 degree electrical cycle of the inverter.

The vehicle may have a direction of motion with respect to the guideway, the reflective pattern may include an alternating pattern of reflective segments and substantially non-reflective segments, and each of the reflective segments and the substantially non-reflective segments may have a common dimension along the direction of motion.

A position of the 360 degree electrical cycle may correspond to one of the substantially non-reflective segments, the one of the substantially non-reflective segments may have a reflective sub-segment disposed between two substantially non-reflective sub-segments, and the circuit may be further adapted to reset the position to zero based upon one of the pulses corresponding to the reflective sub-segment, the one of the pulses having a smaller pulse width than the pulse width of the others of the pulses.

The reflective pattern may include a repetitive pattern having a length which corresponds to the 360 degree electrical cycle of the inverter. The length may be about 432 mm.

The guideway may include a wayside location, the circuit may comprise a modulator and a radio transmitter at the vehicle, and a radio receiver, a demodulator and a processor at the wayside location, the modulator may convert the pulses to a frequency-shift keying signal, the radio transmitter may transmit the frequency-shift keying signal to the radio receiver, the radio receiver may receive the transmitted frequency-shift keying signal and output a received frequency-shift keying signal to the demodulator, the demodulator may output a plurality of pulses to the processor, and the processor may accumulate the pulses from the demodulator to determine the position corresponding to the 360 degree electrical cycle of the inverter.

As another aspect of the invention, a method for determining the position of a vehicle which moves responsive to an inverter having a 360 degree electrical cycle comprises: employing a guideway comprising a linear synchronous motor excited by the inverter; moving a vehicle with respect to the guideway and the linear synchronous motor thereof; disposing a reflective pattern along the guideway; directing a light from the vehicle toward the reflective pattern; reflecting the light from the reflective pattern; sensing the reflected light and outputting a plurality of pulses corresponding to movement of the vehicle with respect to the reflective pattern; and determining the position of the vehicle from the pulses, the position corresponding to the 360 degree electrical cycle of the inverter.

The method may employ a wayside control location associated with the guideway, and may wirelessly transmit the pulses to the wayside control location.

The method may wirelessly receive the transmitted pulses as received pulses at the wayside control location, and may accumulate the received pulses to determine the position corresponding to the 360 degree electrical cycle of the inverter.

The method may further comprise employing a direction of motion of the vehicle with respect to the guideway, disposing an alternating pattern of reflective segments and substantially non-reflective segments on the reflective pattern, employing a common dimension for each of the reflective segments and the substantially non-reflective segments along the direction of motion, employing a position of the 360 degree electrical cycle of the inverter corresponding to one of the substantially non-reflective segments, employing the one of the substantially non-reflective segments having a reflective sub-segment disposed between two substantially non-reflective sub-segments, and resetting the position to zero based upon one of the pulses corresponding to the reflective sub-segment, the one of the pulses having a smaller pulse width than the pulse width of the others of the pulses.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

As employed herein, the term "wireless" shall expressly include, but not be limited by, radio frequency (RF), wireless area networks, IEEE 802.11 (e.g., 802.11a; 802.11b; 802.11g), IEEE 802.15 (e.g., 802.15.1; 802.15.3, 802.15.4), other wireless communication standards, DECT, PWT, pager, PCS, Wi-Fi, Bluetooth™, and cellular.

The present invention is described in association with a Magnetic Levitated Vehicle (MAGLEV), although the invention is applicable to a wide range of vehicles that move with respect to a guideway including a linear synchronous motor.

Figure 2:
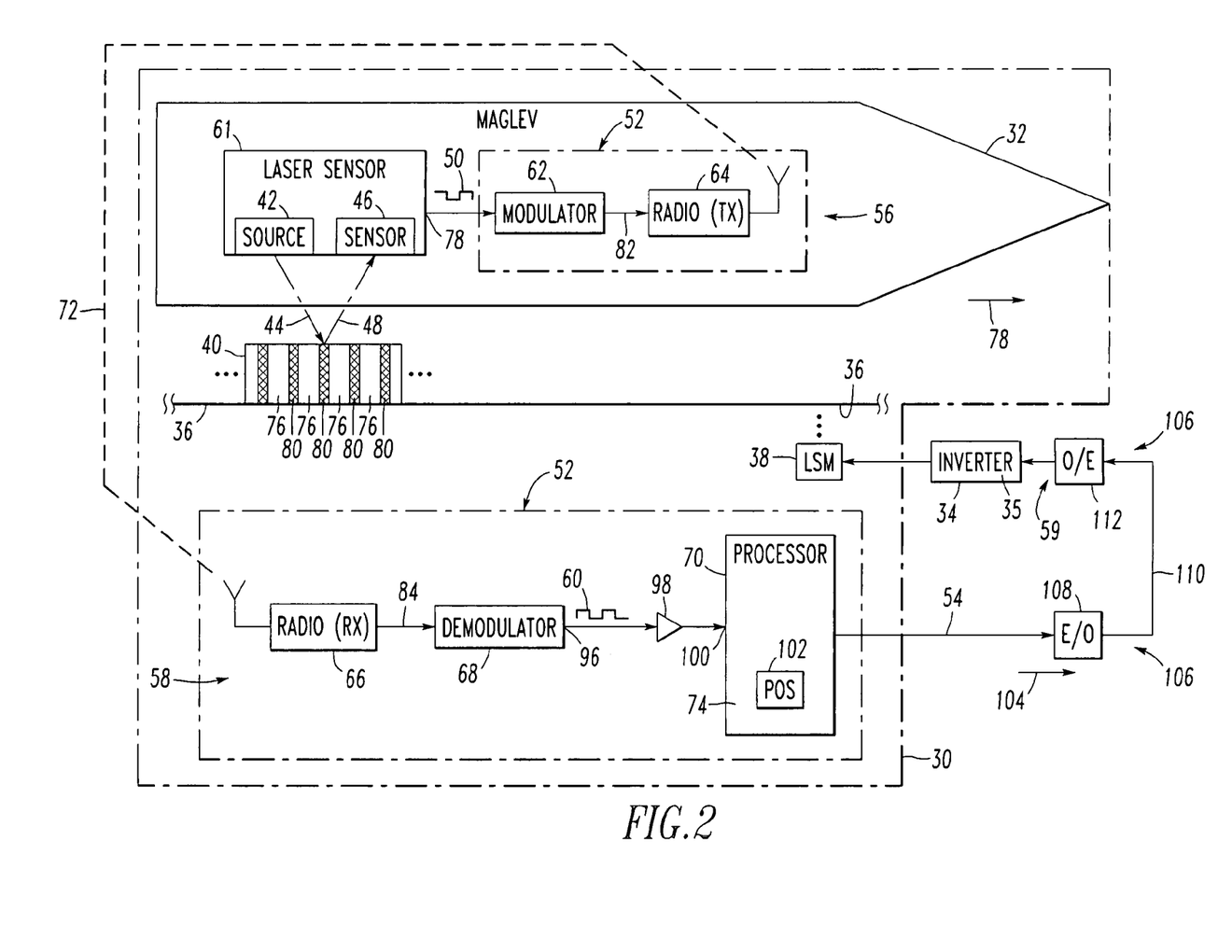
FIG. 2 is a block diagram of an optical position and speed sensing system in accordance with the present invention.

Referring to FIG. 2, a system 30 determines the position of a MAGLEV 32 which moves responsive to an inverter 34 having a 360° electrical cycle 35. The system 30 includes a guideway 36 including a linear synchronous motor (LSM) 38 excited by the inverter 34. The MAGLEV 32 is adapted to move with respect to the guideway 36 and the LSM 38 thereof. A suitable reflective pattern 40 is disposed along the guideway 36. A suitable light source 42 is coupled to the MAGLEV 32 and is adapted to direct light 44 toward the reflective pattern 40. A suitable light sensor 46 is also coupled to the MAGLEV 32 and is adapted to sense reflected light 48 originating from the light source 42 as reflected from the reflective pattern 40. The light sensor 46 outputs a plurality of pulses 50 corresponding to movement of the MAGLEV 32 with respect to the reflective pattern 40. A circuit 52 cooperates with the light sensor 46 and is adapted to determine the position 54 of the MAGLEV 32 from the pulses 50. The position 54 corresponds to the 360° electrical cycle 35 of the inverter 34.

The system 30 includes a MAGLEV-based circuit 56 to source the light 44, to detect the pulses 50 onboard the moving MAGLEV 32, and to transmit the detected pulses 50 from the MAGLEV 32 to a wayside-based circuit 58. The circuit 58 processes received pulses 60 to extract position data and transmits that position data to an inverter control system 59 for the inverter 34.

EXAMPLE 1

The MAGLEV-based circuit 56 includes a suitable laser sensor 61 (e.g., without limitation, a World-Beam™ QS30 Laser Series photoelectric sensor marketed by Banner Engineering Corp. of Minneapolis, Minn.), a suitable modulator 62 and a suitable radio transmitter (TX) 64. The wayside-based circuit 58 includes a suitable radio receiver (RX) 66, a suitable demodulator 68 and a suitable processor 70 (e.g., without limitation, a PIC® model 18C452 marketed by Microchip Technology Inc. of Chandler, Ariz.).

The MAGLEV-based circuit 56 and the wayside-based circuit 58 are each powered by suitable corresponding power supplies (not shown).

The system 30 senses MAGLEV position through the use of the MAGLEV-coupled laser source 42 aimed at the reflective pattern 40 along the guideway 36. The light 48 reflected back to the sensor 46 results in the sequence of the pulses 50. Then, the pulses 50 are transmitted to the wayside-based circuit 58 by a suitable wireless signal 72, such as narrowband FM radio. Next, at the wayside-based circuit 58, the received pulses 60 are accumulated in software 74 of the processor 70 to determine the position 54.

In particular, the laser sensor 61 directs the light 44 (e.g., a beam of visible red light) on the reflective pattern 40 (e.g., encoded optical tape) coupled to the guideway 36 beneath the MAGLEV 32. When the sensor 46 passes over a reflective (e.g., a white segment or bar) area 76 of the reflective pattern 40, a portion of the light 44, namely 48, is reflected back to the sensor 46, thereby producing the pulses 50 at output 78. As the laser sensor 61 moves over the reflective pattern 40, a sequence of the pulses 50 is produced due to the alternating reflection of the laser light 44 from the surface of the reflective pattern 40. The pulse width or the frequency of the pulses 50 represent MAGLEV velocity, while the cumulative count of the pulses 50 represents the MAGLEV position 54 within a suitable measurement interval.

For example, the MAGLEV 32 has a direction of motion 78 with respect to the guideway 36, The reflective pattern 40 includes an alternating pattern of the reflective areas 76 and substantially non-reflective areas 80 (e.g., black segments or bars). Each of those areas 76,80 has a common dimension along the direction of motion 78.

In this example, the modulator 62 converts the pulses 50 to a frequency-shift keying (FSK) signal 82 and the MAGLEV radio TX 64 transmits the FSK signal 82 as the wireless radio signal 72 to the wayside radio RX 66. In turn, the radio RX 66 outputs a received FSK signal 84 to the demodulator 68 which, in turn, outputs the pulses 60 to the processor 70. The processor software 74 accumulates the pulses 60 to determine the position 54 corresponding to the inverter 360° electrical cycle 35.

Although only one LSM 38 and only one inverter 34 in one zone of the guideway 36 are shown, it will be appreciated that the guideway 36 preferably has a plurality of zones (not shown), each of which includes its own LSM and its own inverter.

EXAMPLE 2

Figure 3:
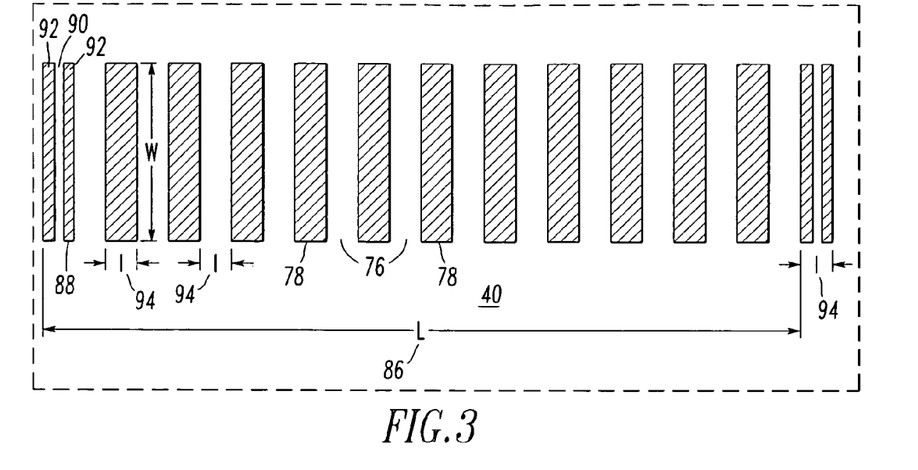
FIG. 3 is a plan view of the encoded reflective pattern of FIG. 2.

FIG. 3 shows a close-up of a relevant portion of the example reflective pattern 40 of FIG. 2. The length L 86 (e.g., without limitation, a 432 mm segment) represents a single 360° electrical cycle from the standpoint of the inverter 34. This length 86 is repeated as a repetitive pattern along the length of the guideway 36 of FIG. 2. The split segments 88, which occur every 432 mm in this example, denote the 360° electrical cycle boundaries and are recognized by the processor software 74 of FIG. 2 as reset points. By use of the example split segments 88 to denote such cycle boundaries, the need for a second radio channel for the detection of cycle boundaries is avoided.

In particular, a starting position of the inverter 360° electrical cycle 35 corresponds to one of the split segments 88, which is a substantially non-reflective segment, and which has a reflective sub-segment 90 disposed between two substantially non-reflective sub-segments 92. The processor software 74 of FIG. 2 is further adapted to reset the position 102 to zero based upon one of the pulses 60 corresponding to the reflective sub-segment 90. That pulse has a smaller pulse width than the pulse width of the other pulses 60. Hence, at specific intervals (i.e., in this example, every 432 mm), the position 102 is reset to zero. This is accomplished by varying the width of pulses 60 corresponding to the segments 88, which results in an abrupt decrease in pulse width at the reset points.

EXAMPLE 3

In this example, the reflective pattern 40 has 12 alternating reflective segments 76 (e.g., white bars) and 12 substantially non-reflective segments 78,88 (e.g., black bars) (e.g., having a common dimension, such as length, 194, of 18 mm along the MAGLEV direction of motion 78 of FIG. 2). Each of the segments 76,78,88 represents 15° of the single 360° electrical cycle 35 from the standpoint of the inverter 34.

EXAMPLE 4

The first segment 88 of the substantially non-reflective segments 78 (e.g., black bars) is a split segment, which occur every 432 mm in this example, to denote the 360° electrical cycle boundary and, thus, the reset point.

EXAMPLE 5

Each of the segments 76,78,88 has a suitable width (e.g., about 100 mm), which is normal to the direction of motion 78 of FIG. 2.

EXAMPLE 6

The pulses 50 (FIG. 2), which are 0–12 VDC pulses, are converted to the FSK signal 82 through the modulator 62 (e.g., without limitation, a suitable modem; a Bell 202 compatible modem). The resulting FSK signal 82 is applied to the input of the radio TX 64 (e.g., without limitation, a suitable narrowband FM UHF transmitter operating at 451.8 MHz with a maximum power output of 5 W (adjustable)). For example, the use of the narrowband FM radio link avoids the latency typically associated with some spread spectrum wireless modems.

EXAMPLE 7

At the wayside-based circuit 58, the radio RX 66 (e.g., without limitation, a suitable narrowband FM UHF receiver operating at 451.8 MHz)) outputs the received FSK signal 84 to the demodulator 68 (e.g., suitable modem). The pulse stream output 96 of the demodulator 68 (e.g., at a suitable level; an RS-232C level; a ±12 V level) is converted to a suitable logic level (e.g., 5V) by buffer 98 and is applied to an input 100 of the processor 70.

EXAMPLE 8

The pulses 60 (FIG. 2) are sensed by the processor 70 through a suitable interrupt mechanism, which responds to any change in state of the input 100. Each interrupt event causes the accumulated position (POS) 102 to be updated. Through the use of internal timers (not shown), the time width (e.g., seconds) of each of the pulses 60 is determined, thereby providing a measure of MAGLEV velocity (e.g., in this example, the velocity in meters per second is equal to 0.001 M/mm×18 mm/time width of one of the pulses 60 corresponding to the segments 76).

EXAMPLE 9

The processor software 74 (FIG. 2) senses the reset point (the boundary of the length L 86) by comparing the current pulse width with the previous pulse width. If the current pulse width is significantly less than the previous pulse width, then it is assumed that the reset point (e.g., sub-segment 90 in this example) has been encountered and the accumulated position (e.g., angle) 102 is reset to zero. The sensing of the reset point is based on the assumption that, due to inertia, the MAGLEV 32 cannot significantly change velocity from one of the pulses 50 to the next one of the pulses 50 and that any large variation in pulse width (i.e., about one-half) between consecutive received pulses 60 can only be due to the fact that the reset point of the reflective pattern 40 has been encountered.

EXAMPLE 10

The position and velocity data is assembled into a serial message 104 by the processor 70 and is transferred to the control system 59 of the inverter 34 by a suitable high speed (e.g., 1.25 Mb) serial link 106. For example, this transfer is interrupt driven and occurs at 2 ms intervals. In this example, the serial link 106 includes a suitable fiber optic transmitter (E/O) 108, a suitable fiber optic cable 110 and a suitable fiber optic receiver (O/E) 112, although any suitable electrically isolated communication link may be employed.

EXAMPLE 11

Figure 4:
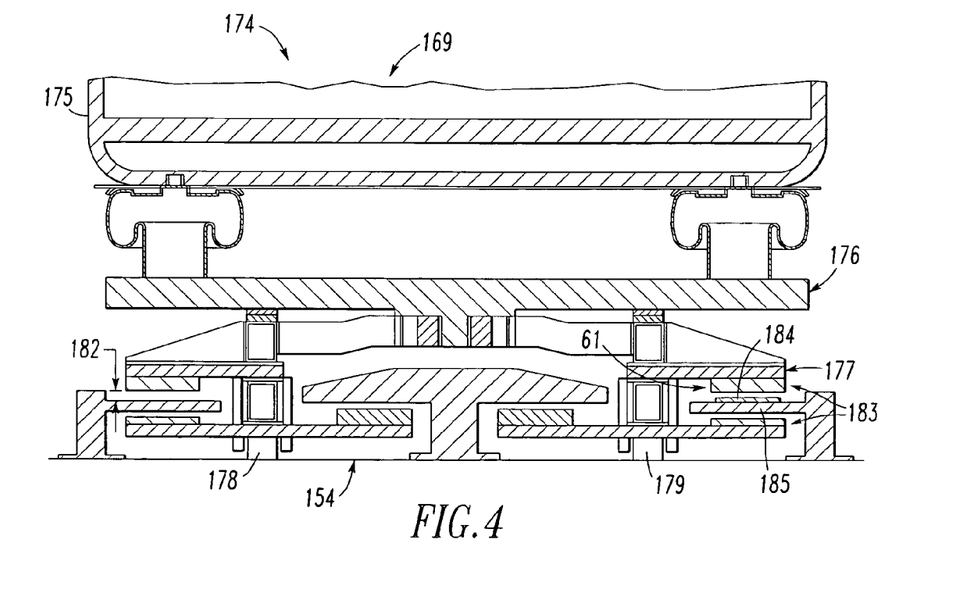
FIG. 4 is an elevational end view of a MAGLEV including the laser sensor, the guideway and the encoded reflective pattern of FIG. 2 in accordance with another embodiment of the invention.

FIG. 4 shows a MAGLEV 169 and a guideway 154 of a MAGLEV system 174. The exemplary MAGLEV 169 includes a cab portion 175, a bolster assembly 176 and a bogie assembly 177 having plural landing wheels, such as 178,179. Normally, however, the wheels 178,179 are retracted and a suitable clearance 182 is maintained between the moving MAGLEV 169 and the guideway 154. In this example, the laser sensor 61 (FIG. 2) is coupled on a permanent magnet array 183, and optical tape 184 including the reflective pattern 40 (FIG. 3) disposed thereon is coupled on a Litz wire support track 185 of the guideway 154. The optical tape 184 is suitably coupled or mounted on the upper surface of the track 185 and runs in the direction of travel of the MAGLEV 169. The laser sensor 61 (FIG. 2) is suitably coupled or mounted on the inside edge of the permanent magnet array 183 above the track 185 and at about the center (not shown) of the MAGLEV 169.

EXAMPLE 12

Alternatively, the laser sensor 61 may be suitably coupled or mounted on the front or leading edge, or on the rear or trailing edge of the permanent magnet array 183.

EXAMPLE 13

As a further example, if plural permanent magnet arrays are employed, then the laser sensor 61 may be suitably coupled or mounted on an edge of one of two adjacent arrays in the gap therebetween.

Although example MAGLEV-based and wayside-based circuits 56,58 are shown, it will be appreciated that a combination of one or more of analog, digital and/or processor-based circuits may be employed.

The system 30 obtains dynamic MAGLEV location information in a timely manner with a suitable accuracy. The system 30 conveys that information from the moving MAGLEV 32 to the fixed wayside-based circuit 58 for the purpose of closed loop propulsion control. This ensures that the location information is not corrupted by relatively high levels of electromagnetic noise present along the guideway 36. The present system 30 is inherently immune to electromagnetic noise. The operating characteristics of the laser sensor 61 are such that operation is unaffected for the range in height anticipated during all phases of operation of the MAGLEV 32. Hence, the integrity of the data is not affected by projected changes in MAGLEV height above the fixed guideway 36.

The position detection process employed by the wayside-based circuit 58 senses each light-to-dark or dark-to-light transition at the processor 70 through an interrupt, which increments a pulse counter (not shown) to update the position 102. The time interval between successive interrupts is employed to identify the "short" pulses, which denote the phase boundary. This eliminates ambiguity and results in much more consistent detection of intervals. Hence, the processing of analog signals for peak detection is not required. Power consumption aboard the MAGLEV 32 is also reduced. For example, the MAGLEV-based circuit 56 employs less than about 1 W to operate the laser sensor 61 and less than about 5 W to power the radio TX 64. This is much less than the power that would otherwise be needed by a low frequency inductively coupled signal.

Furthermore, the wayside installation costs are reduced. The system 30 employs one or more strips of optical tape including the reflective pattern 40, thereby resulting in both labor and material cost savings with respect to a continuous string of electrical circuitry along the entire length of a MAGLEV guideway for an inductively coupled signal.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A system for determining the position of a vehicle which moves responsive to an inverter having a 360 degree electrical cycle, said system comprising:
   a guideway comprising a linear synchronous motor excited by said inverter;
   a vehicle adapted to move with respect to said guideway and the linear synchronous motor thereof;
   a reflective pattern disposed along said guideway;
   a light source coupled to said vehicle, said light source adapted to direct light toward said reflective pattern;
   a light sensor coupled to said vehicle, said light sensor adapted to sense the light from said light source which is reflected from said reflective pattern and to output a plurality of pulses corresponding to movement of said vehicle with respect to said reflective pattern; and
   a circuit cooperating with said light sensor, said circuit adapted to determine the position of said vehicle from said pulses, said position corresponding to the 360 degree electrical cycle of said inverter.

2. The system of claim 1 wherein said circuit is further adapted to determine the velocity of said vehicle from said pulses.

3. The system of claim 1 wherein said vehicle is a maglev vehicle.

4. The system of claim 1 wherein said vehicle has a direction of motion with respect to said guideway; wherein said reflective pattern includes an alternating pattern of reflective segments and substantially non-reflective segments; and wherein each of said reflective segments and said substantially non-reflective segments have a common dimension along said direction of motion.

5. The system of claim 4 wherein a position of the 360 degree electrical cycle of said inverter corresponds to one of said substantially non-reflective segments; wherein said one of said substantially non-reflective segments has a reflective sub-segment disposed between two substantially non-reflective sub-segments; and wherein said circuit is further adapted to reset said position to zero based upon one of said pulses corresponding to said reflective sub-segment, said one of said pulses having a smaller pulse width than the pulse width of the others of said pulses.

6. The system of claim 1 wherein said reflective pattern includes a repetitive pattern having a length which corresponds to the 360 degree electrical cycle of said inverter.

7. The system of claim 6 wherein said length is about 432 mm.

8. The system of claim 7 wherein said vehicle has a direction of motion with respect to said guideway; wherein said reflective pattern includes an alternating pattern of twelve reflective segments and twelve substantially non-reflective segments; and wherein each of said reflective segments and said substantially non-reflective segments has a common dimension of about 18 mm along said direction of motion, said common dimension representing 15 degrees of the 360 degree electrical cycle of said inverter.

9. The system of claim 8 wherein a position of the 360 degree electrical cycle of said inverter corresponds to one of said twelve substantially non-reflective segments; wherein said one of said twelve substantially non-reflective segments has a reflective sub-segment disposed between two substantially non-reflective sub-segments; and wherein said circuit is further adapted to reset said position to zero based upon one of said pulses corresponding to said reflective sub-segment, said one of said pulses having a smaller pulse width than the pulse width of the others of said pulses.

10. The system of claim 1 wherein said vehicle has a direction of motion with respect to said guideway; and wherein said reflective pattern includes a width of about 100 mm, said width being normal to said direction of motion.

11. The system of claim 1 wherein said guideway includes a wayside location; wherein said circuit comprises a modulator and a radio transmitter at said vehicle, and a radio receiver, a demodulator and a processor at said wayside location; wherein said modulator converts said pulses to a frequency-shift keying signal; wherein said radio transmitter transmits said frequency-shift keying signal to said radio receiver; wherein said radio receiver receives said transmitted frequency-shift keying signal and outputs a received frequency-shift keying signal to said demodulator; wherein said demodulator outputs a plurality of pulses to said processor; and wherein said processor accumulates the pulses from said demodulator to determine said position corresponding to the 360 degree electrical cycle of said inverter.

12. The system of claim 1 wherein said vehicle is a maglev vehicle including a permanent magnet array; and wherein said light source and said light sensor are coupled to the permanent magnet array of said maglev vehicle.

13. The system of claim 12 wherein said reflective pattern is disposed on an optical tape; wherein said guideway includes a Litz wire support track; and wherein said optical tape is coupled to said Litz wire support track.

14. A method for determining the position of a vehicle which moves responsive to an inverter having a 360 degree electrical cycle, said method comprising:
   employing a guideway comprising a linear synchronous motor excited by said inverter;
   moving a vehicle with respect to said guideway and the linear synchronous motor thereof;
   disposing a reflective pattern along said guideway;
   directing a light from said vehicle toward said reflective pattern;
   reflecting said light from said reflective pattern;
   sensing the reflected light and outputting a plurality of pulses corresponding to movement of said vehicle with respect to said reflective pattern;
   determining the position of said vehicle from said pulses, said position corresponding to the 360 degree electrical cycle of said inverter; and
   employing said position by an inverter control system for said inverter.

15. The method of claim 14 further comprising
   employing a wayside control location associated with said guideway; and
   wirelessly transmitting said pulses to said wayside control location.

16. The method of claim 15 further comprising
   wirelessly receiving the transmitted pulses as received pulses at said wayside control location; and
   accumulating the received pulses to determine said position corresponding to the 360 degree electrical cycle of said inverter.

17. The method of claim 16 further comprising
   including said position in a serial message; and
   transmitting said serial message to the inverter control system for said inverter.

18. The method of claim 16 further comprising
   triggering an interrupt at a processor with each of said received pulses; and
   updating an accumulator by said processor responsive to said interrupt.

19. The method of claim 18 further comprising measuring a time duration of one of said received pulses; and determining the speed of said vehicle from said time duration.

20. The method of claim 14 further comprising employing a direction of motion of said vehicle with respect to said guideway;

disposing an alternating pattern of reflective segments and substantially non-reflective segments on said reflective pattern;

employing a common dimension for each of said reflective segments and said substantially non-reflective segments along said direction of motion;

employing a position of the 360 degree electrical cycle of said inverter corresponding to one of said substantially non-reflective segments;

employing said one of said substantially non-reflective segments having a reflective sub-segment disposed between two substantially non-reflective sub-segments; and resetting said position of said vehicle to zero based upon one of said pulses corresponding to said reflective sub-segment, said one of said pulses having a smaller pulse width than the pulse width of the others of said pulses.

* * * * *